(12) United States Patent
Altshuler

(10) Patent No.: US 11,061,218 B2
(45) Date of Patent: Jul. 13, 2021

(54) APPARATUS AND METHOD FOR MAINTAINING PRECISE END-TO-END RELATIVE POSITION BETWEEN TWO OPTICAL FIBERS

(71) Applicant: Canon U.S.A., Inc., Melville, NY (US)

(72) Inventor: Alexander Altshuler, Cambridge, MA (US)

(73) Assignee: Canon U.S.A., Inc., Melville, NY (US)

( * ) Notice: Subject to any disclaimer, the term of this patent is extended or adjusted under 35 U.S.C. 154(b) by 0 days.

(21) Appl. No.: 16/828,385

(22) Filed: Mar. 24, 2020

(65) Prior Publication Data

US 2020/0310102 A1    Oct. 1, 2020

Related U.S. Application Data

(60) Provisional application No. 62/826,596, filed on Mar. 29, 2019.

(51) Int. Cl.
*G02B 23/24*    (2006.01)
*G02B 6/06*    (2006.01)

(52) U.S. Cl.
CPC .......... *G02B 23/2469* (2013.01); *G02B 6/06* (2013.01)

(58) Field of Classification Search
None
See application file for complete search history.

(56) References Cited

U.S. PATENT DOCUMENTS

| | | |
|---|---|---|
| 5,321,501 A | 6/1994 | Swanson et al. |
| 6,134,003 A | 10/2000 | Tearney et al. |
| 7,515,265 B2 | 4/2009 | Alfano et al. |
| 8,335,409 B2 | 12/2012 | Popp |
| 8,644,988 B2 | 2/2014 | Prisco et al. |
| 9,335,485 B2 | 5/2016 | Zhang et al. |
| 9,846,940 B1 | 12/2017 | Wang et al. |

(Continued)

OTHER PUBLICATIONS

Kim, W., et al., "Lensless, ultra-wideband fiber optic rotary joint for biomedical applications", Optics Letters, May 1, 2016, pp. 1973-6, vol. 41, No. 9.

*Primary Examiner* — Chad H Smith
(74) *Attorney, Agent, or Firm* — Canon U.S.A., Inc., IP Division

(57) ABSTRACT

According to at least one embodiment of the present disclosure, there is provided an apparatus comprising: a first optical fiber in communication with a light source; a second optical fiber in communication with an imaging probe; and a fiber optic rotary joint (FORJ) where a distal end of the first optical fiber and a proximal end of the second optical fiber are positioned coaxially with a gap between the fibers' end faces. The FORJ is adapted to transmit light between the fibers' end faces, and to rotate at least one of first and second optical fibers relative to the other. An actuator is configured to axially translate at least one of the first and second optical fibers relative to the other in a reciprocal motion. A light intensity sensor is adapted to measure light intensity changes due to optical interference between light reflected from the fibers' end faces. And, a control system is configured to receive light intensity measurements from the sensor and to use the light intensity measurements to control the reciprocal motion of the linear actuator to maintain the length of the gap between fibers' end faces substantially constant.

20 Claims, 4 Drawing Sheets

(56) References Cited

U.S. PATENT DOCUMENTS

| | | |
|---|---|---|
| 10,095,020 B2 | 10/2018 | Tearney et al. |
| 2011/0164846 A1 | 7/2011 | Zhang et al. |
| 2015/0126856 A1* | 5/2015 | Tachibana ............ A61B 1/0016 600/425 |

* cited by examiner

APPARATUS AND METHOD FOR MAINTAINING PRECISE END-TO-END RELATIVE POSITION BETWEEN TWO OPTICAL FIBERS

CROSS-REFERENCE TO RELATED APPLICATIONS

The present application claims priority to U.S. provisional application 62/826,596 filed Mar. 29, 2019, the disclosure of which is incorporated by reference herein in its entirety.

BACKGROUND INFORMATION

Field of the Disclosure

The present disclosure relates to optical devices. More particularly, the disclosure exemplifies apparatus and method for maintaining precise end-to-end relative position between two optical fibers. The present disclosure is even more particularly directed to subject matter detailing optical structures situated at the end of one fiber or fiber cable which is to form an optical junction.

Description of Related Art

Using optical fibers for imaging is getting more and more prevalent in a number of applications that can benefit from small probe size and high fidelity images. In most of these applications, in order to provide a reasonable field of view, it is necessary to mechanically rotate the probing fiber. In order to provide continuous light transmission between the rotating probing fiber and a stationary optical system containing a light source and a light detector, a special unit conventionally called fiber optic Rotary Joint (FORJ) is usually employed. To reduce positional accuracy requirements at the FORJ, beam expansion optics (such as collimators) are generally used for beam transmission in a gap between stationary and rotating fibers. Due to chromatic aberration this approach creates challenges in systems with more than one working light wavelength or in systems using broadband light.

To overcome the aforementioned obstacles, various solutions are being developed with a direct fiber-to-fiber junction. Examples of such solutions include, but are not limited to, patent and patent application publications US 2011/0164846 A1, U.S. Pat. Nos. 8,644,988, 8,335,409, and 9,335,485, and non-patent publication entitled "Lensless, ultra-wideband fiber optic rotary joint for biomedical applications", by Kim et al., Optics Letters, May 1, 2016; Vol. 41 No. 9:1973-6 (herein "Kim"). Kim has proposed the use of lubricants with a refractive index equal to or larger than the fiber core as the most desirable solution to reduce reflections from fiber ends and to provide lubrication for the rotating fiber. Similarly, publication US 2011/0164846 also discloses a fiber optic joint which uses index matching fluid for pressure compensation purposes. In the examples above, the use of index matching lubricating liquid requires the addition of sealing elements, such as a rubber or plastic o-ring, which makes the rotary joint more costly and prone to malfunction. Publications U.S. Pat. Nos. 8,335,409 and 9,335,485 are directed to multi-channel fiber optic joints, which may not necessarily apply to a single channel fiber optic rotary joint.

In addition, for such arrangements, the larger the gap between fibers the higher is the insertion loss of the rotary junction. In addition, for a rotary junction involving double clad fibers, a larger gap will lead to more crosstalk between the cores and clads of the fibers being joined. Although the solutions to these issues would benefit from the smallest possible gap between fiber ends, very small gaps are difficult to maintain without the risk of the fiber ends coming into contact and touching each other. When the fibers touch each other during rotation, mechanical damage to the fiber ends is detrimental to the device. These considerations are currently preventing designers from using smaller gaps between fibers.

Therefore, avoiding fiber damage by maintaining an appropriate gap between the two fiber end faces is important to achieve long operational lifetimes and low insertion loss.

SUMMARY OF EXEMPLARY EMBODIMENTS

According to at least one embodiment of the present disclosure, there is provided an apparatus comprising: a first optical fiber in optical communication with a light source; a second optical fiber in optical communication with an imaging probe; and a fiber optic rotary joint (FORJ) where a distal end of the first optical fiber and a proximal end of the second optical fiber are positioned coaxially with a gap between the fibers' end faces. The FORJ is adapted to transmit light between the fibers' end faces, and to rotate at least one of the first and second optical fibers relative to the other. An actuator is configured to axially translate at least one of the first and second optical fibers relative to the other in a reciprocal motion. A light intensity sensor is adapted to measure light intensity changes due to optical interference between light reflected from the fibers' end faces. And, a control system is configured to receive light intensity measurements from the sensor and to use the light intensity measurements to control the reciprocal motion of the linear actuator to maintain the length of the gap between fibers' end faces substantially constant.

These and other objects, features, and advantages of the present disclosure will become apparent upon reading the following detailed description of exemplary embodiments of the present disclosure, when taken in conjunction with the appended drawings, and provided claims.

BRIEF DESCRIPTION OF DRAWINGS

Further objects, features and advantages of the present disclosure will become apparent from the following detailed description when taken in conjunction with the accompanying figures showing illustrative embodiments of the present disclosure.

Figure 1:
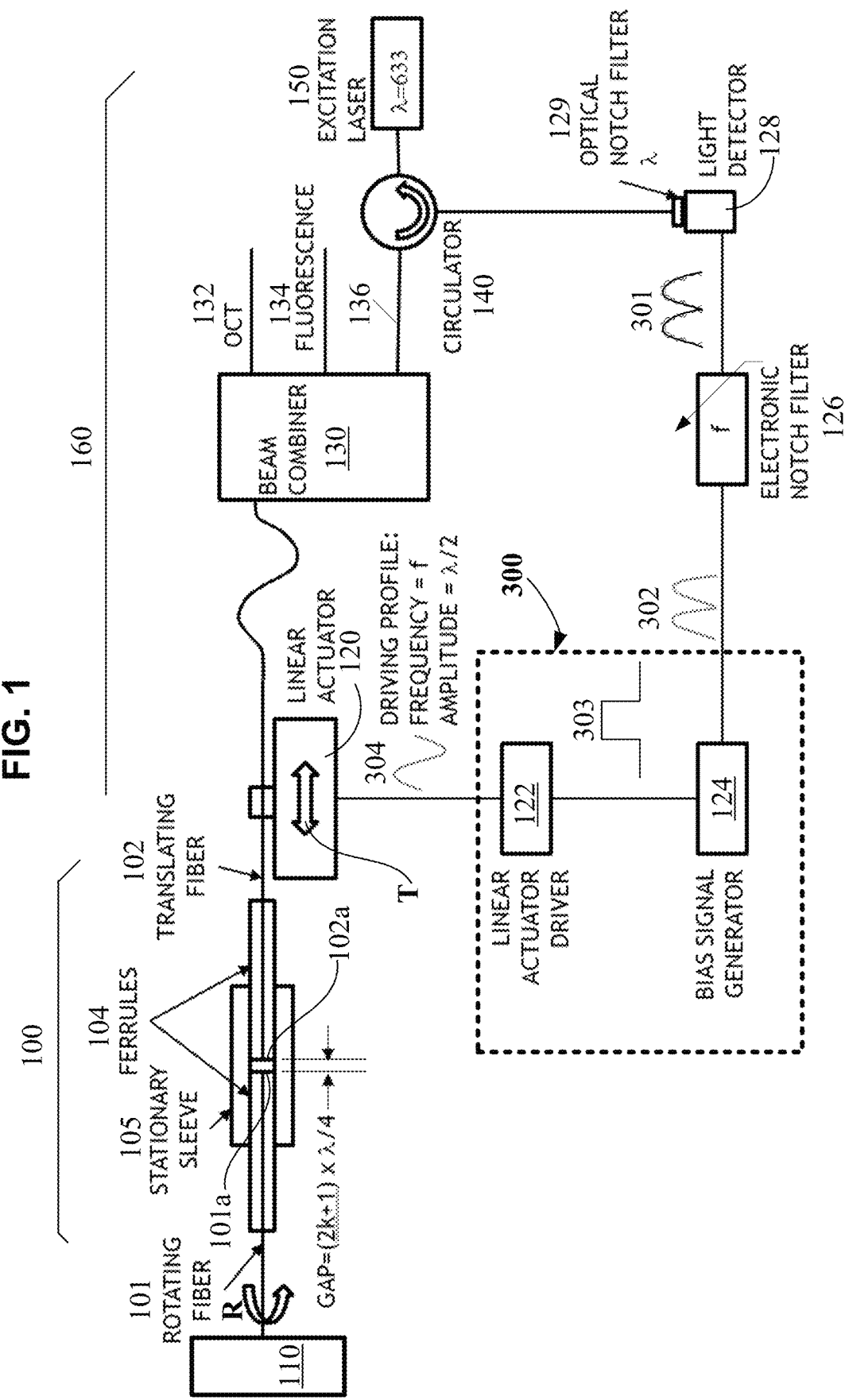
FIG. 1 is a block diagram of an apparatus or system in which a fiber optic rotary joint (FORJ) in accordance with the present disclosure can be employed.

Throughout the figures, the same reference numerals and characters, unless otherwise stated, are used to denote like features, elements, components or portions of the illustrated embodiments. Moreover, while the subject disclosure will now be described in detail with reference to the figures, it is done so in connection with the illustrative exemplary embodiments. It is intended that changes and modifications can be made to the described exemplary embodiments without departing from the true scope and spirit of the subject disclosure as defined by the appended claims.

When a feature or element is herein referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "connected", "attached", "coupled" or the like to another feature or element, it can be directly connected, attached or coupled to the other feature or element or intervening features or elements may be present. In contrast, when a feature or element is referred to as being "directly connected", "directly attached" or "directly coupled" to another feature or element, there are no intervening features or elements present. Although described or shown with respect to one embodiment, the features and elements so described or shown in one embodiment can apply to other embodiments. It will also be appreciated by those of skill in the art that references to a structure or feature that is disposed "adjacent" to another feature may have portions that overlap or underlie the adjacent feature.

DETAILED DESCRIPTION OF EXEMPLARY EMBODIMENTS

The embodiments are based on, among other things, an object of improving the shortcomings of know fiber optic rotary coupling or rotary joints. With the presently disclosed fiber optic rotary joint, a gap between fibers' ends can be dynamically adjusted such that optical signals of broadband light are transmitted therethrough with minimal insertion loss. Advantageously, a controller is adapted to generate a bias signal shifting the range of the reciprocal motion of the linear actuator to maintain the length of the gap between fibers' end faces substantially constant.

FIG. 1 is a block diagram of a medical instrument (an apparatus) in which a fiber optic rotary joint (FORJ) in accordance with the present disclosure can be employed. FIG. 1 illustrates a fiber rotary joint 100 connected to a probe 110 and controlled by a control system 160. The control system 160 includes, among other things, a linear actuator 120, a beam combiner 130, and signal processing circuit 300.

According to an exemplary embodiment of the present disclosure, the fiber optic rotary joint 100 includes two optical fibers (a first fiber 101 and a second fiber 102) arranged along a common axis Ox, such that the fiber ends (101a and 102a) are facing each other with a very narrow gap (GAP) therebetween. In other words the two fibers 101 and 102 are arranged coaxially along the same axis Ox. The narrow gap between the two fiber ends is specifically designed to be adjustable such that optical signals of broadband light are transmitted therethrough with minimal insertion loss. In addition, the fibers are arranged in a manner that allows a relative rotation or oscillation R of at least one of the two fibers about the common fiber axis Ox. To provide rotation or oscillation action, the fiber optic rotary joint 100 includes a rotational device configured to rotate at least one of the first optical fiber and the second optical fiber at a rate that is greater than 100 revolutions per second. The rotational device includes at least one of a direct current (DC) motor or a stepping motor along with an encoder to track and control the rotation rate. An example of a fiber optic rotary joint is described in U.S. Pat. No. 7,382,949 which is incorporated by reference herein for all purposes.

Notable, in the present disclosure, the gap between the fibers' end surfaces is specifically designed to be adjustable to a minimal gap distance while ensuring that the fibers do not touch each other during rotation. In this manner, not only mechanical damage to the fiber ends is prevented, but also optimal light transmission with minimal insertion loss is achieved.

In the embodiment of FIG. 1, the second fiber 102, which is also referred to as a stationary fiber 102, is configured to not rotate. Since the stationary fiber 102 does not rotate, it is instead axially displaced linearly to adjust the gap between the fibers' end faces. However, it is envisaged that the rotating fiber 100 may also be axially displaced linearly while rotating. In the present disclosure, on one end (a proximal end), the stationary fiber 102 is connected to the control system 160, and on the other end (a distal end), the stationary fiber 102 is connected to the FORJ 100. The control system 160 is comprised of a light source 150, light detector 128, a signal processing circuit 300, and electronic control circuitry related thereto. The first fiber lot, which is also referred to as a rotating fiber lot, is adapted to rotate or oscillate in direction R about its own axis Ox. On one end (a proximal end), the rotating fiber 100 is connected to the FORJ 100; and on the other end (a distal end), the rotating fiber is connected to the probe 11o. In this manner, the distal end 102a of the stationary fiber 102 and the proximal end 101a of the rotating fiber 101 are arranged facing each other in the FORJ 100. Here, the ends of both fibers are preferably glued to ferrules 104 and polished for optical transmission quality. Both ferrules 104 are placed into a closely fitting stationary sleeve 105 for precise optical alignment.

One of the fibers, preferably the stationary fiber 102, is mounted on a precision linear actuator 120 which can translate this fiber linearly in an axial direction T thus adjusting the gap size between the two fiber ends. An example of the linear actuator 120, which may be part of the rotary joint 100, is a motorized precision translation stage mounted on a stationary rail. The linear actuator 120 is electronically controlled by a linear actuator driver 122 to move the stationary fiber (second fiber 102) axially in the axial direction T in a reciprocating manner. Notably, the axial movement of stationary fiber 102 is controlled by the linear actuator driver 122 to have a sinusoidal (or another predetermined) pattern with a predetermined frequency "f", and an amplitude of "$\lambda/2$", where $\lambda$ is a wavelength of the system's light source. Specifically, the amplitude of the sinusoidal pattern would be the amplitude of a signal detected by detector 128 when the sinusoidal signal is at "$\lambda/2$" or "$\lambda/4$" of the interference signal shown in FIG. 2A and FIG. 2B.

In this manner, the linear actuator driver 122 is configured to impart a reciprocal linear motion in the axial direction T to the stationary fiber 102 within a predetermined range thereby changing the length of the gap between the fibers' end faces. The range of axial movement of the stationary fiber 102 can be in multiples of the wavelength $\lambda$ to be able to accurately monitor the gap size. For example, the gap between fibers' end faces is within a range of $\lambda/4$ and $50\lambda$, as explained in more detail below.

In the present exemplary embodiment, the light source 150 is an excitation laser configured to emit substantially monochromatic light having a wavelength $\lambda=633$ nm. The light source 150 is configured to emit light (or other electromagnetic radiation) which is then input into the proximal end of the stationary fiber 102, via a beam combiner 130. The beam combiner 130 includes a first optical channel 132 (e.g., a channel for an OCT signal), a second optical channel 124 (e.g., a channel for a fluorescence signal), and a third optical channel 136 (a channel for light used as a gap-measuring signal). The light source 150 is not limited to a laser source. As long as a substantially monochromatic light or other electromagnetic radiation can be used monitor and control the gap size, any light source can be used. The light detector 128 is adapted to measure intensity of the light returned from the stationary fiber 102 through the beam combiner 130. A photodiode, an array of photodiodes, or any sensor configured to detect light intensity of wavelength $\lambda$ can be used as the light detector 128. The light detector 128 may include, for example a photomultiplier tube (PMT), a photodiode, an avalanche photodiode detector (APD), a charge-coupled device (CCD), multi-pixel photon counters (MPPC), or the like.

To send light to the fiber 102, the light source 150 is connected to the beam combiner 130 via the third channel 136 (e.g., an optical fiber) and a circulator 140. When light is sent from the light source 150 to the fiber 102 via the circulator 140 and the beam combiner 130, a first portion of the light is first reflected at the end face 102a of fiber 102 and a second portion of the light is reflected at the end face 101a of the fiber lot. The reflected light returns through fiber 102, the beam combiner 130, the circulator 140, and is detected by light detector 128.

When the gap between the fibers ends 102a and 101a is relatively small, e.g., in an order of magnitude of a fraction to few multiples of the wavelength $\lambda$, an interference signal can be observed in the returning light detected by light detector 128. Specifically, interference occurs between the light reflected from the end surface 102a of the stationary fiber 102 and the light reflected from the adjacent end surface 101a of the rotating fiber lot. The fiber 101 and fiber 102 may include any type of fiber, such as single-mode, multimode, and double-clad fibers, which may be chosen according to the desired application.

Figure 2:
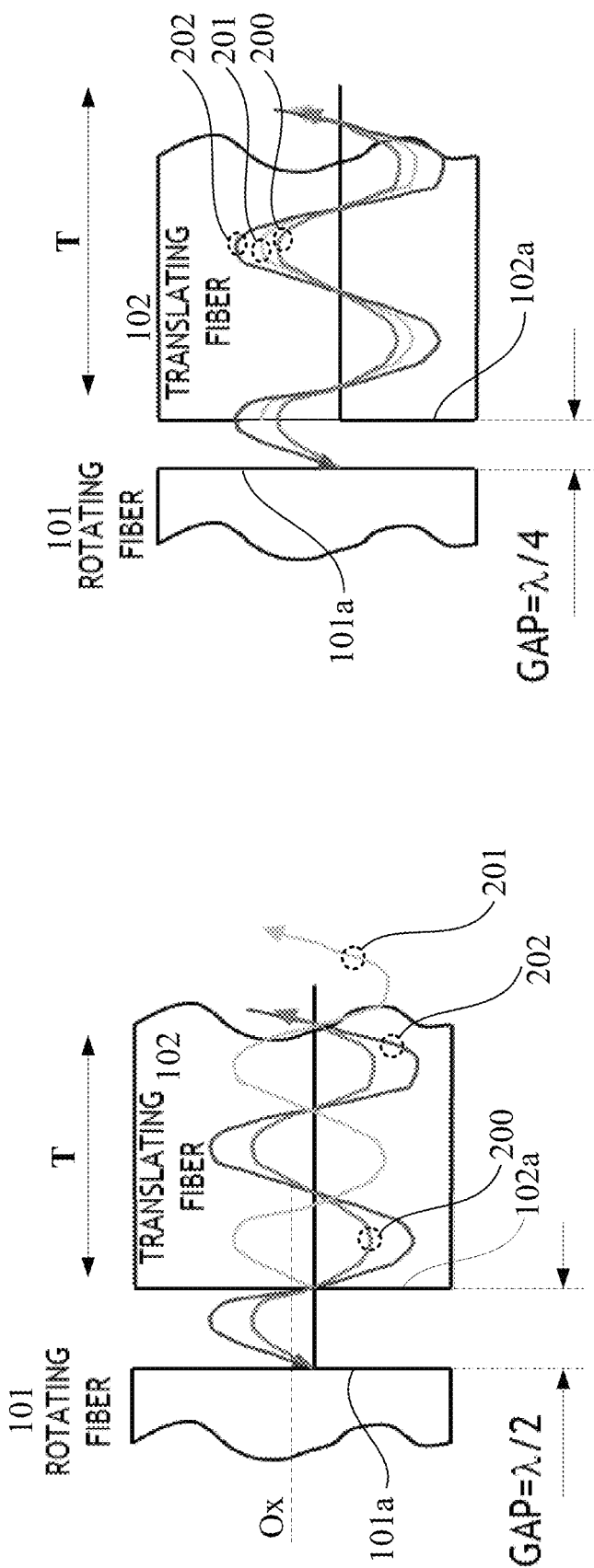
FIGS. 2A and 2B graphically illustrate exemplary interference signals as a function of the length of the gap between fibers' end faces.

FIGS. 2A and 2B graphically illustrate exemplary interference signals as it would be observed from returning light detected by the light detector 128. FIG. 2A illustrates interference at a gap distance of $\lambda/2$, and FIG. 2B illustrates interference at a gap distance of $\lambda/4$. As the fiber end 102a of the stationary fiber 102 moves axially in an oscillating pattern thereby changing the gap length between the rotating fiber 101 and the stationary fiber 102, the intensity of the detected light 200 will fluctuate due to interference between returning light 201 (reflected from end surface 102a) and returning light 202 (reflected from end surface 101a). The intensity of the detected light 200 changes from a minimum value at destructive interference position to a maximum value at a constructive interference position. In FIG. 2A, light 201 reflected from the end surface 10o2a and the light 202 reflected from the end surface 101a are out of phase by a period of $\lambda/2$, the resulting light 200 has very low amplitude. In FIG. 2B, light 201 reflected from the end surface 10o2a and the light 202 reflected from the end surface 101a are out of phase by a period of $\lambda/4$, the resulting light 200 has amplitude approximately corresponding to half the intensity of the input light. The resulting electrical signal 301 from the detector 128 will resemble a positively inverted sine function as shown in FIG. 1.

As it is simpler to control linear oscillations about the maximum (or, alternatively, minimum) signal position, the mean gap length in this case would be given by the equation GAP=(2K+1)*$\lambda$/4 for maximum (or GAP=2K*$\lambda$/4 for minimum), where K is an integer greater than zero and $\lambda$ is the wavelength of light being used.

The resulting electrical signal from the detector 128 will resemble a positively inverted sine function 301. As shown in FIG. 1, the electrical signal from the detector (inverted sine function 301) may include noise artifacts. To increase signal-to-noise ratio of this output, it will be beneficial to add an optical filter 129 (e.g., a notch filter) in the optical path of the return light (allowing only light of wavelength $\lambda$ through) to the detector 128. Similarly, an electronic filter 126 allowing only an electrical signal 302 of frequency f to pass through from the detector 128 can be beneficially added to the output of the detector.

From this output and knowing the actual position of the linear actuator 120, a maximum (constructive interference) and/or minimum (destructive interference) output signal positions of the stationary fiber may be determined by a signal processing circuit 300 and, if the gap length is changed, a correcting bias signal 303 may be generated and added to the linear actuator driving signal 304 to return the gap to the desired size. This will close a feedback loop by generating a signal proportional to a deviation of the maximum (or minimum) interference point from the center of oscillation. In other words, according to the present disclosure, the control system 160 includes the signal processing circuit 300 configured to implement a feedback loop adapted to generate a bias signal shifting the range of the reciprocal motion of the linear actuator to maintain the length of the gap between fibers end faces substantially constant. That is, any deviation from a desired gap size can be adjusted to maintain the length of the gap between the fibers' end faces substantially constant. In addition, the feedback loop can be configured such that the gap size can be adjusted to maintain the length of the gap between fibers end faces within certain thresholds. For example, in environments where the fibers are subjected to work at very high speeds of rotation and/or where the fibers function under high temperatures, the fiber ends may undergo certain thermal expansion. Therefore, it can be convenient to consider the fiber's linear thermal expansion coefficient to allow for certain minimum (threshold) variations in the gap size.

The actuator as controlled in the present disclosure allows to servo control the fiber position (gap) about a sensor maximum (or minimum) incrementally, but not absolutely. If the initial gap is set to $\lambda$, it will servo from $\lambda/2$ to $\lambda$ centered on $3\lambda/4$ (the closest maximum) with a $\lambda/4$ range of reciprocal motion. If the initial gap is $30\lambda$ (within the $\lambda$ to $50\lambda$ gap range), it will servo from $29\frac{1}{2}\lambda$ to $30\lambda$ about $29\frac{3}{4}\lambda$ maximum with a $\lambda/2$ range of reciprocal motion. If the gap size is too large, the efficiency of the rotary joint goes down as light from the core fans out with an angle defined by numeric aperture (NA) of the fiber. Therefore, at least for certain applications, large gaps over $50\lambda$ may not be practical. But the range of reciprocal motion should ideally cover at least one maximum and 2 minima to servo efficiently about the maximum (or vice-versa).

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like. An I/O interface can be used to provide communication interfaces to input and output devices, which may include a keyboard, a display, a mouse, a touch screen, touchless interface (e.g., a gesture recognition device) a printing device, a light pen, an optical storage device, a scanner, a microphone, a camera, a drive, communication cable and a network (either wired or wireless).

Figure 3:
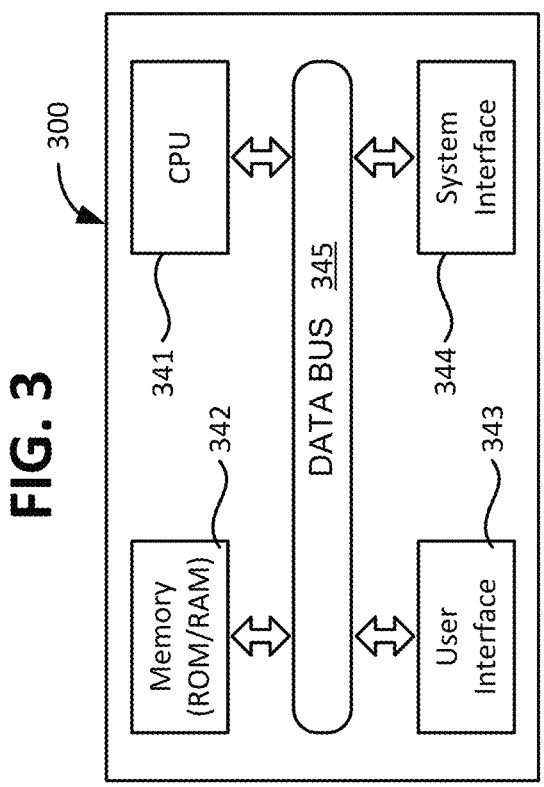
FIG. 3 shows an exemplary diagram of a calculator configured to implement a feedback loop adapted to generate a bias signal shifting the range of the reciprocal motion of the linear actuator to maintain the length of the gap between fibers end faces substantially constant.

FIG. 3 illustrates an exemplary functional diagram of the signal processing circuit 300. As shown in FIG. 3, a signal processing circuit 300 may include, among other things, a central processing unit (CPU) 341, a storage memory 342 including volatile random access memory (RAM) and non-volatile read only memory (ROM), a user input/output (I/O) interface 343, and a system interface 344 which are operatively interconnected via a data bus 345. The signal processing circuit 300 can be programmed to issue a command that can be transmitted to the various parts of the system 160 and FORJ 100 upon receiving a user input via the user interface 343. A touch panel screen panel, a key board, mouse, joy-stick, ball controller, and foot pedal can be included as part of the user interface 343. Using the user interface 343, the user can cause a command to operate the system 160 and control the FORJ 100. For example, when a user inputs a command via the user interface 343, the command is transmitted to the central processing unit CPU 341 for execution of a given program routine thereby causing the CPU 341 to issue a command via the system interface 344 to one or more of the light source (150), light detector (128) actuator (120), or the FORJ 100.

The CPU 341 may include one or more microprocessors (processors) configured to read and perform computer-executable instructions stored in the storage memory 342. The computer-executable instructions may include program code for the performance of the novel processes, methods and/or calculations disclosed herein.

The storage memory 342 includes one or more computer readable and/or writable media, which may include, for example, a magnetic disc (e.g., a hard disk), an optical disc (e.g., a DVD, a Blu-ray), a magneto-optical disk, semiconductor memory (e.g., a non-volatile memory card, flash memory, a solid state drive, SRAM, DRAM), an EPROM, an EEPROM, etc. Storage memory 342 may store computer-readable data and/or computer-executable instructions.

The system interface 344 provides electronic communication interface to input and output devices, which may include a keyboard, a display, a mouse, a printing device, a touch screen, a light pen, an optical storage device, a scanner, a microphone, a camera, a drive, communication cable and a network (either wired or wireless).

Figure 4:
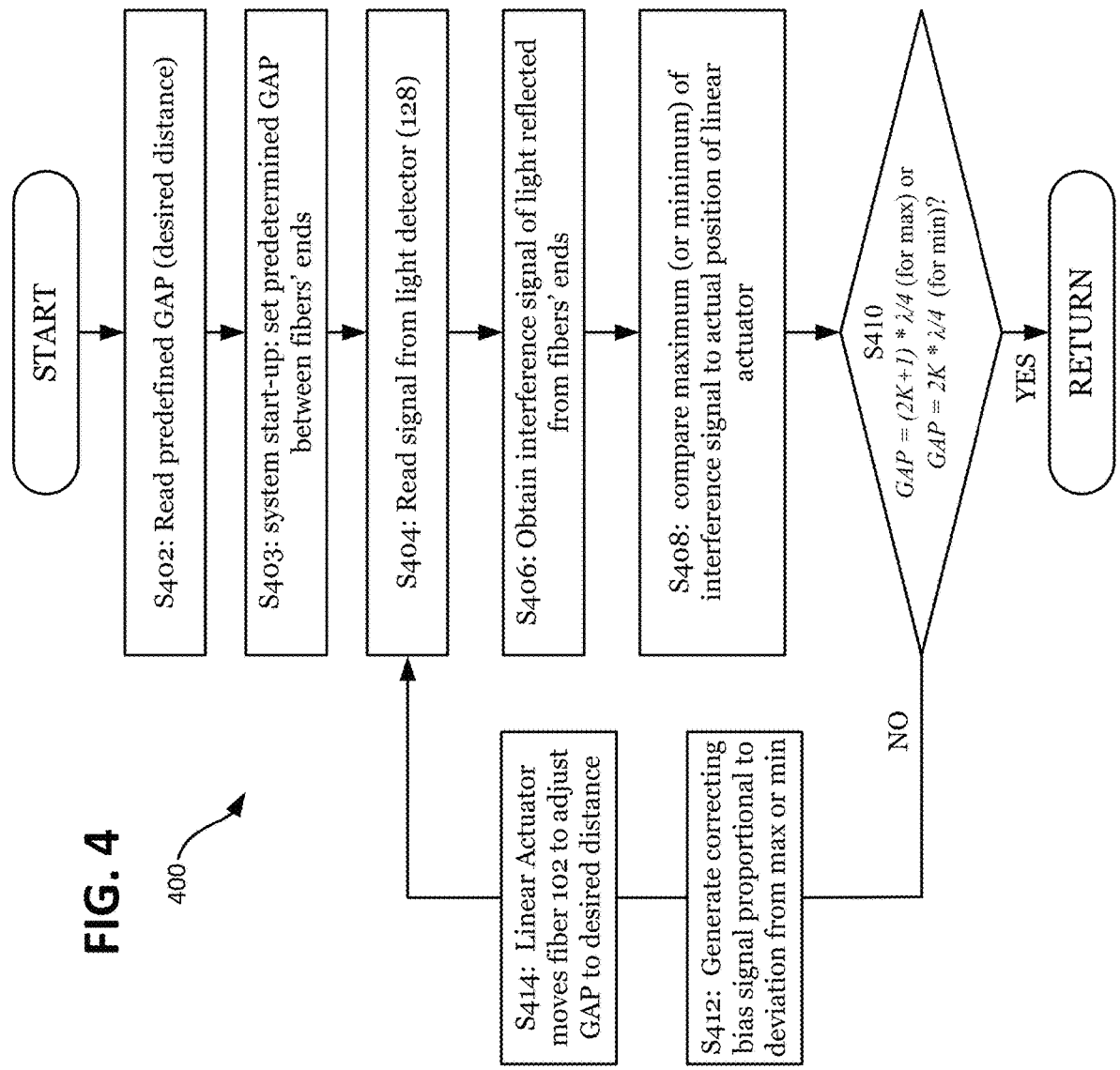
FIG. 4 illustrates an exemplary flow diagram of a process for generating a bias signal to shift the range of the reciprocal motion of the linear actuator to maintain the length of the gap between fibers end faces substantially constant.

FIG. 4 illustrates an exemplary flow diagram of a process 400 for generating a bias signal to shift the range of the reciprocal motion of the linear actuator to maintain the length of the gap between fibers end faces substantially constant. According to FIG. 4, the process 400 assumes the control system 160 starts a continuous operation of an imaging probe 110, whereby the signal processing circuit 300 implements the feedback loop to control the gap distance between the fibers' end surfaces 101a and 102a of fiber 101 and fiber 102, respectively. However, even prior to starting operation of the probe, at step S402, the signal processing circuit 300 acquires or sets a predefined distance of the gap between the two fibers. This predefined distance can be based on device tolerances, type of fibers, numerical aperture (NA) of fibers, etc., or other relevant information which can be stored in storage memory 342 at the time of device manufacture, for example. The at step S403, at the system start-up, the fibers end surfaces in the rotary joint are initially brought to a physical contact, by the linear actuator 120. Then, the stationary fiber 102 is moved by the linear actuator the predetermined distance to form the desired GAP. After that, the linear actuator 120 starts oscillating in the manner described above for implementation of the positioning control shown in FIGS. 1 and 4. At step S404, the signal processing circuit 300 reads the signal output by the light detector 128. At step S406, based on the signal from the light detector 128, the signal processing circuit 300 or other signal processing device obtains an interference signal 301. At step S408, after any necessary signal processing (e.g., noise reduction, filtering, etc.) of the interference signal, the signal processing circuit 300 determines a maximum (or minimum) value of the interference signal, and compares such value to the actual position of the linear actuator. At step S410, the signal processing circuit 300 determines whether the gap requirement satisfies the requirement of GAP=(2K+1)*λ/4 for maximum (or GAP=2K*λ/4 for minimum), where K is an integer and λ is the wavelength of light being used. If the gap requirement is satisfied (YES in S410), the process returns to normal imaging process. If the gap requirement is not satisfied (NO in S410), the process advances to step S412, where the controller generates a correcting bias signal 303. At step S414, the signal processing circuit 300 adds the correcting bias signal 303 to the linear actuator driving signal 304 to return the gap to the desired size or distance.

The imaging operation of the system 160 can be based on interferometric methods as, for example, Optical Coherence Tomography (OCT), or on non-interferometric methods as, for example, spectrally encoded endoscopy (SEE). Exemplary methods of OCT imaging are described in U.S. Pat. Nos. 5,321,501, 6,134,003, and 7,515,265; and spectrally encoded endoscopy (SEE) imaging methods are described in U.S. Pat. No. 9,846,940 and U.S. patent Ser. No. 10/095,020, which are all incorporated by reference herein in their entirety. On the other hand, the gap control is based on the interference signal of the reflections (the returning light) between the light reflected from the end surface of the stationary fiber and the light reflected from the adjacent end surface of the rotating fiber.

Advantageously, the present disclosure allows for avoiding fiber damage by maintaining an appropriate gap between the two fiber end faces without the use of index matching lubrication liquids. In addition, since the gap between the two fiber end faces, can be continuously monitored by the feedback loop, it is possible to maintain the two fiber ends at the desired separation, which will achieve long operational lifetimes without the possibility of damaging the fiber ends due to contact with each other.

Definitions

In referring to the description, specific details are set forth in order to provide a thorough understanding of the examples disclosed. In other instances, well-known methods, procedures, components and circuits have not been described in detail as not to unnecessarily lengthen the present disclosure. Unless defined otherwise herein, all technical and scientific terms used herein have the same meaning as commonly understood by one of ordinary skill in the art to which this invention belongs. The breadth of the present invention is not to be limited by the subject specification, but rather only by the plain meaning of the claim terms employed.

It should be understood that if an element or part is referred herein as being "on", "against", "connected to", or "coupled to" another element or part, then it can be directly on, against, connected or coupled to the other element or part, or intervening elements or parts may be present. In contrast, if an element is referred to as being "directly on", "directly connected to", or "directly coupled to" another element or part, then there are no intervening elements or parts present. When used, term "and/or", may be abbreviated as "/", and it includes any and all combinations of one or more of the associated listed items, if so provided.

Spatially relative terms, such as "under" "beneath", "below", "lower", "above", "upper", "proximal", "distal", and the like, may be used herein for ease of description to describe one element or feature's relationship to another element(s) or feature(s) as illustrated in the various figures. It should be understood, however, that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, a relative spatial term such as "below" can encompass both an orientation of above and below. The device may be otherwise oriented (rotated 90 degrees or at other orientations) and the spatially relative descriptors used herein are to be interpreted accordingly. Similarly, the relative spatial terms "proximal" and "distal" may also be interchangeable, where applicable.

The term "about" or "approximately" as used herein means, for example, within 10%, within 5%, or less. In some embodiments, the term "about" may mean within measurement error. In this regard, where described or claimed, all numbers may be read as if prefaced by the word "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), etc. Any numerical range, if recited herein, is intended to be inclusive of end values and includes all sub-ranges subsumed therein, unless specifically stated otherwise.

The terms first, second, third, etc. may be used herein to describe various elements, components, regions, parts and/or sections. It should be understood that these elements, components, regions, parts and/or sections should not be limited by these terms. These terms have been used only to distinguish one element, component, region, part, or section from another region, part, or section. Thus, a first element, component, region, part, or section discussed below could be termed a second element, component, region, part, or section without departing from the teachings herein.

The terminology used herein is for the purpose of describing particular embodiments only and is not intended to be limiting. As used herein, the singular forms "a", "an", "said" and "the", are intended to include the plural forms as well, unless the context clearly indicates otherwise. It should be further understood that the terms "includes" and/or "including", when used in the present specification, specify the presence of stated features, integers, steps, operations, elements, and/or components, but do not preclude the presence or addition of one or more other features, integers, steps, operations, elements, components, and/or groups thereof not explicitly stated. It is further noted that some claims may be drafted to exclude any optional element; such claims may use exclusive terminology as "solely," "only" and the like in connection with the recitation of claim elements, or it may use of a "negative" limitation.

In describing example embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner.

While the present disclosure has been described with reference to exemplary embodiments, it is to be understood that the present disclosure is not limited to the disclosed exemplary embodiments. The scope of the following claims is to be accorded the broadest interpretation so as to encompass all such modifications and equivalent structures and functions.

What is claimed is:

1. A position control apparatus comprising:
a light source;
a light intensity sensor;
a first optical fiber in optical communication with the light source;
a second optical fiber adapted to rotate about its longitudinal axis relative to the first fiber;
a rotary joint adapted to transmit light of a wavelength $\lambda$ between the first and the second optical fibers;
at least one linear actuator controlled by a linear actuator driver and adapted to translate at least one of the first and the second optical fibers axially; and
a processor configured to receive an input signal from the light intensity sensor and to provide an output signal to the linear actuator driver;
wherein:
the first and the second optical fibers each has one end extending into the rotary joint where both fibers' ends are positioned coaxially with a gap between their end faces;
the at least one linear actuator driver is configured to impart a reciprocal axial motion to the at least one linear actuator such that the at least one of the first and the second optical fibers translates axially back-and-forth in a predetermined range thereby reciprocally changing a length of the gap between the fibers' end faces;

the light intensity sensor is configured to measure light intensity changes due to optical interference between light reflected from the end faces of the first and the second optical fibers as the at least one of the first and the second optical fibers translates axially back-and-forth; and the processor is configured to use the input signal from the light intensity sensor to generate a correcting bias signal used for shifting the range of the reciprocal axial motion of the at least one linear actuator to maintain the length of the gap between the fibers' end faces substantially constant.

2. The apparatus according to claim 1, wherein the light source is a laser source configured to generate substantially monochromatic light having the wavelength λ.

3. The apparatus according to claim 2, wherein the gap between the fibers' end faces is within a range of 0.25λ to 50λ.

4. The apparatus according to claim 2, further comprising:
an optical filter arranged in an optical path of the light intensity sensor and configured to allow transmission of substantially monochromatic light of the wavelength λ to the light intensity sensor.

5. The apparatus according to claim 4, wherein the gap between the fibers' end faces is within a range of 0.25λ to 50λ.

6. The apparatus according to claim 2, wherein the predetermined range of the reciprocal axial motion of the at least one linear actuator is within a range of λ/4 to λ.

7. The apparatus according to claim 4, wherein the predetermined range of the reciprocal axial motion of the at least one linear actuator is within the range of λ/4 and λ.

8. The apparatus according to claim 1,
wherein the reciprocal axial motion of the at least one linear actuator is a reciprocal motion based on a substantially sinusoidal pattern formed by the light intensity changes due to the optical interference, and
wherein the sinusoidal pattern has a frequency f, where f=1/(the period between two consecutive maxima or minima of the sinusoidal pattern).

9. The apparatus according to claim 8,
wherein the output of the light intensity sensor is electrically filtered to only transmit an electrical signal of the frequency f, and
wherein a resulting electrical signal from the light intensity senor includes a positively inverted function of the sinusoidal pattern.

10. The apparatus according to claim 9, further comprising a bias signal generator,
wherein the bias signal generator is configured to use the resulting electrical signal to generate a correcting bias signal and provide the correcting bias signal to the linear actuator to maintain the gap at a desired size.

11. The apparatus according to claim 1, further comprising an optical probe,
wherein the optical probe is arranged distal to the rotary joint,
wherein the second optical fiber is a proximal optical fiber configured to establish optical communication between the rotary joint to the light source, and
wherein the first optical fiber is a distal optical fiber configured to establish optical communication between the rotary joint and the optical probe.

12. The apparatus according to claim 11,
wherein the proximal optical fiber is configured to not rotate and configured to translate in a reciprocal manner in a direction parallel to its longitudinal axis, and wherein the distal optical fiber is configured to rotate or oscillate about its longitudinal axis.

13. The apparatus according to claim 1,
wherein the processor determines whether the input signal from the light intensity sensor satisfies:
(i) a gap requirement for maximum intensity of the input signal given by GAP=(2K+1)*λ/4, or
(ii) a gap requirement for minimum intensity of the input signal given by GAP=2K*λ/4,
where K is an integer greater than zero, and λ is the wavelength of light emitted by the light source and detected by the light intensity sensor.

14. The apparatus according to claim 13,
wherein, when the gap requirement is not satisfied, the processor generates a correcting bias signal, and adds the correcting bias signal to a driving signal of the linear actuator driver to impart an axial motion to the at least one linear actuator such that the at least one of the first and the second optical fibers translates axially to return the gap to a desired size.

15. The apparatus according to claim 13,
wherein, when the gap requirement is not satisfied, the processor generates a correcting signal proportional to a deviation from the maximum or minimum intensity, and
wherein the processor uses the correcting signal in a feedback loop to control the linear actuator to maintain the length of the gap between fibers' end faces within a minimum deviation from a center of oscillation.

16. A method for controlling a distance between fibers' end faces of a fiber optic rotary joint which transmits light between first and second optical fibers, the method comprising:
arranging the first and the second optical fibers each having one end extending into the fiber optic rotary joint such that both fiber ends are positioned coaxially with a gap between their end faces;
transmitting light of a wavelength λ through at least one of the first and second optical fibers;
controlling a linear actuator to impart a reciprocal axial motion to the at least one of the first and the second optical fibers which translates axially back-and-forth in a predetermined range thereby reciprocally changing a length of the gap between the fibers' end faces;
during the reciprocal axial motion, measuring light intensity changes due to optical interference between light reflected from the end faces of the first and the second optical fibers using a light intensity sensor; and
based on an input signal corresponding to the light intensity changes detected by the light intensity sensor, generating a correcting bias signal for shifting the range of the axial motion of the linear actuator to maintain the length of the gap between fibers' end faces substantially constant.

17. The method of claim 16, further comprising:
determining whether the input signal satisfies
(i) a gap requirement for maximum intensity of the input signal given by GAP=(2K+1)*λ/4, or
(ii) a gap requirement for minimum intensity of the input signal given by GAP=2K*λ/4, where K is an integer greater than zero, and λ is the wavelength of light reflected from the fibers' end faces and detected by the light intensity sensor.

18. The method of claim 17,
wherein, when the gap requirement is not satisfied, generating a correcting bias signal, and adding the correcting bias signal to a driving signal of the linear actuator to impart an axial motion to the at least one of the first and the second optical fibers to return the gap to a desired size.

19. The method of claim 17, wherein, when the gap requirement is not satisfied, generating a correcting bias signal proportional to a deviation from the maximum or minimum intensity, and adding the correcting bias signal to a driving signal of the linear actuator in a feedback loop to control the linear actuator to maintain the length of the gap between fibers' end faces within a minimum deviation from a center of oscillation.

20. A non-transitory computer-readable medium storing thereon computer-readable instructions, which when executed by one or more processors, implement a method for controlling a distance between fibers' end faces of a fiber optic rotary joint which transmits light between first and second optical fibers, the method comprising:

arranging the first and the second optical fibers each having one end extending into the fiber optic rotary joint such that both fiber ends are positioned coaxially with a gap between their end faces;

transmitting light through at least one of the first and second optical fibers;

controlling a linear actuator to impart a reciprocal axial motion to the at least one of the first and the second optical fibers which translates axially back-and-forth in a predetermined range thereby reciprocally changing a length of the gap between the fibers' end faces;

during the reciprocal axial motion, measuring light intensity changes due to optical interference between light reflected from the end faces of the first and the second optical fibers; and based on an input signal corresponding to the light intensity changes, generating a correcting bias signal for shifting the range of the axial motion of the linear actuator to maintain the length of the gap between fibers' end faces substantially constant.

* * * * *